UNITED STATES PATENT OFFICE.

CHARLES GIFFORD, OF BRAINTREE, MASSACHUSETTS.

IMPROVEMENT IN PREPARING SHOE-PEGS.

Specification forming part of Letters Patent No. 5,780, dated September 19, 1848.

*To all whom it may concern:*

Be it known that I, CHARLES GIFFORD, of Braintree, in the county of Norfolk and State of Massachusetts, have invented a new and Improved Mode of Preparing Shoe-Pegs, of which I do hereby declare the following is a full and exact description.

The nature of my improvement consists in saturating common wooden shoe-pegs with a certain composition, whereby the pegs become hardened, are prevented from swelling or shrinking, and consequently repel water better and cling to the leather better than any other peg.

The component parts of this composition and the mode of its application are as follows, viz: Of any given quantity I take three parts rosin, one part bayberry wax or tallow, and two parts of tar or pitch, all of which I boil together to a heat that will ignite substances easily combustible. I then add comparatively a small quantity of cold water, but enough to allay the heat, so as not to burn the pegs, which I then stir into the liquid, they having been previously baked dry, and being moderately hot, adding more pegs from time to time, if necessary, until the whole composition is absorbed or taken up.

The quantity of pegs for any given quantity of the liquid will depend upon the discretion of the individual. All things considered, about one bushel of common maple pegs to two quarts of the liquid is a fair proportion. Other compositions may be employed; but I prefer the above.

What I claim, and desire to secure by Letters Patent, is—

The application of water-proof compositions to shoe-pegs, in the manner and for the purposes above specified.

CHAS. GIFFORD.

Witnesses:
GEORGE W. BROWN,
WILLIAM PERKINS.